(12) United States Patent
Kaertner et al.

(10) Patent No.: US 6,590,925 B1
(45) Date of Patent: Jul. 8, 2003

(54) DOUBLE-CHIRPED MIRROR SYSTEMS AND METHODS

(75) Inventors: Franz X. Kaertner, Rheinstetten (DE); Erich P. Ippen, Belmont, MA (US); Uwe Morgner, Neuburg (DE); James G. Fujimoto, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 121 days.

(21) Appl. No.: 09/630,293

(22) Filed: Aug. 1, 2000

Related U.S. Application Data

(60) Provisional application No. 60/162,666, filed on Nov. 1, 1999.

(51) Int. Cl.[7] ................................................. H01S 3/08

(52) U.S. Cl. .......................... 372/99; 359/588; 359/584; 372/29.023

(58) Field of Search ............................ 372/20, 25, 102, 372/29.023; 359/588, 584, 25, 102; 385/15, 37

(56) References Cited

U.S. PATENT DOCUMENTS

| | | | |
|---|---|---|---|
| 5,283,796 A | * 2/1994 | Fink ............................ | 372/32 |
| 5,867,304 A | * 2/1999 | Galvanauskas et al. ...... | 372/102 |
| 6,055,261 A | * 4/2000 | Reed et al. ................... | 372/99 |
| 6,081,379 A | * 6/2000 | Austin et al. ................ | 359/584 |
| 6,154,318 A | * 11/2000 | Austin et al. ................ | 372/99 |
| 6,222,673 B1 | * 4/2001 | Austin et al. ................ | 372/99 |
| 6,256,434 B1 | * 7/2001 | Maiuschek et al. ............ | 385/37 |
| 6,301,042 B1 | * 10/2001 | Pelekhuty ..................... | 359/584 |
| 6,301,049 B1 | * 10/2001 | Kuertner et al. ............. | 359/584 |

FOREIGN PATENT DOCUMENTS

WO  WO 99/60675  11/1999

OTHER PUBLICATIONS

F. Gires and P. Tournois, "Interferometre utilizable pour la compression d'impulsions lumineuses modules en frequence," C.R. Acad. Sci. Paris 258, 6112–6115 (1964).

R. Szipöcs, K. Ferencz, C. Spielmann, and F. Krausz, "Chirped multiplayer coatings for broadband dispersion control in femtosecond lasers," Optics Letters 19, 201–203 (1994).

R. Szipöcs, A. Stingl, C. Spielmann, and F. Krausz, "Chirped dielectric mirrors for dispersion control in femtosecond laser systems," SPIE 2377, 11–22 (1995).

A. Stingl, M. Lenzner, Ch. Spielmann, F. Krausz, and R. Szipöcs, "Sub–10 fs mirror–dispersion–controlled Ti:sapphire laser," Optics Letters 20, 602–604 (1995).

J.A. Dobrowolski, A.V. Tikhonravov, M.K. Trubetskov, B.T. Sullivan, and P.G. Verly, "Optimal single–band normal–incidence antireflection coatings," Applied Optics 35, 644–658 (1996).

A. Baltuska, Z. Wei, M. Pshenichnikov, and D. Wiersma, "Optical pulse compression to 5 fs at 1 MHz repetition rate," Optics Letters 22, 102 (1997).

(List continued on next page.)

*Primary Examiner*—Leon Scott, Jr.
(74) *Attorney, Agent, or Firm*—Fish & Richardson P.C.

(57) ABSTRACT

A mirror system for use in generating a short duration laser pulse is disclosed. The system includes first and second double-chirped mirrors disposed along an optical path within a cavity, where the second double-chirped mirror includes an additional phase-shifting layer as compared to the first double-chirped mirror. The additional phase-shifting layer causes the mirror system during use to produce a laser pulse that is characterized by oscillations in group delay substantially reduced in amplitude in comparison to oscillations in group delay for a pulse produced by the same system without the additional phase-shifting layer.

24 Claims, 10 Drawing Sheets

OTHER PUBLICATIONS

M. Nisoli, S. De Silvestri, O. Svelto, R. Szipöcs, K. Ferencz, Ch. Spielmann, S. Sartania, F. Krausz, "Compression of High Energy Lasers Pulse Below 5 fs," Optics Letters 22, 522 (1997).

E.J. Mayer, J. Möbius, A. Euteneuer, W.W. Rühle, and R. Szipöcs, "Ultra-broadband chirped mirrors for femtosecond lasers," Optics Letters 22, 528–530 (1997).

F.X. Kärtner, N. Matuschek, T. Schibli, U. Keller, H.A. Haus, C. Heine, R. Morf, V. Scheuer, M. Tilsch, and T. Tschudi, "Design and Fabrication of Double-Chirped Mirrors," Optics Letters 22, 831–833 (1997).

I.D. Jung, F.X. Kärtner, N. Matuschek, D.H. Sutter, F. Morier-Genoud, U. Keller, V. Scheuer, M. Tilsch, and T. Tschudi, "Self-starting 6.5 fs pulses from a KLM Ti:sapphire laser," Optics Letters 22, 1009–1011 (1997).

R. Szipöcs and A. Kohazi-Kis, "Theory and design of chirped dielectric laser mirrors," Applied Physics B 65, 115–135 (1997).

G. Tempea, F. Krausz, K. Ferencz, and Ch. Spielmann, "Advances in Chirped Mirror Technology," Ultrafast Optics, Monterey, USA, Aug. 3–8, (1997).

D.H. Sutter, I.D. Jung, N. Matuschek, F. Morier-Genoud, F.X. Kärtner, V. Scheuer, M. Tilseh, and T. Tschudi, U. Keller, "Self-starting 7.5 fs pulses from a KLM Ti:sapphire laser using semiconductor storable absorber and double-chirped mirrors," IEEE Journal of Selected Topics in Quantum Electrics (JSTQE) 4, 169 (1998).

N. Matuschek, F.X. Kärtner, and U. Keller, "Theory of double-chirped mirrors," IEEE Journal of Selected Topics in Quantum Electrics (JSTQE) 4, 197–208 (1998).

N. Matuschek, F.X. Kärtner, and U. Keller, "Analytical design of double-chirped mirrors with custom tailored dispersion characteristics," IEEE Journal of Quantum Electronics (JQE) 35, 192–137 (1999).

U. Morgner, F.X. Kärtner, S.H. Cho, Y. Chen, H.A. Haus, J.F. Fujimoto, E.P. Ippen, "Sub-two cycle pulses from a Kerr-Lens modelocked Ti:sapphire laser," to be published in Optics Letters.

V. Laude, P. Tournois, "Chirped-mirror-pairs for ultra-broadband dispersion control." CtuR4 Abstract, CLEO'99.

* cited by examiner

DOUBLE-CHIRPED MIRROR SYSTEMS AND METHODS

This application claims the benefit of provisional application No. 60/162,666 filed Nov. 1, 1999.

BACKGROUND OF THE INVENTION

The invention relates to dielectric mirrors used in laser systems.

An objective of certain types of laser systems is generation of extremely short laser pulses, such as femtosecond pulses. Femtosecond laser pulses are useful in a wide range of technologies, including signal processing, high speed communications, optical imaging, and optical accelerators. As laser system engineers continue to generate shorter and shorter pulses, the frontiers of the above technologies continue to expand.

Laser systems that generate broadband ultra-short pulses must include reflective structures, e.g., mirrors, that achieve high reflectivity over a broad wavelength range. In general, the broadband reflective mirrors in such laser systems are Bragg mirrors that have been modified to control group delay dispersions (GDDs).

Referring to FIG. 1, a standard dielectric Bragg mirror 10 includes alternating high refractive index and low refractive index layers, such as alternating $TiO_2/SiO_2$ layers 12 and 14. Each layer has a thickness of $\lambda_B/4$, where $\lambda_B$ is the Bragg wavelength of the mirror. The high reflectivity bandwidth of standard Bragg mirror 10, however, is only about 200 nm at a center wavelength of 800 nm. The useful high reflectivity bandwidth is further limited (e.g., to about 100 nm) by higher order GDDs produced by standard Bragg mirrors. The bandwidth of an ultra-short pulse generated by a laser system using mirror 10, therefore, will also be unacceptably limited.

To expand the useful high reflectivity bandwidth of standard Bragg mirrors, designers began "chirping" the layer pairs in the mirror. Referring to FIG. 2, in a simple chirped mirror 30, the thickness $T_n$ of individual layer pairs varies along the length of the mirror, shortening toward the front 32 of mirror 30. As a result, longer wavelengths penetrate deeper into the mirror than shorter wavelengths before being reflected, allowing mirror 30 to reflect an enlarged wavelength range. In addition, the reflection includes a negative dispersion, since the longer wavelengths experience more group delay than the shorter wavelengths. This dispersion compensates for the positive dispersion produced by other cavity components in the laser system, such as the laser crystal.

It turns out, however, that simple chirped mirrors do not produce a smooth, controlled group delay. While the local average of the group delay does increase linearly with increasing wavelength, as expected, it also exhibits strong oscillations. The cause of these oscillations is the following. Longer wavelengths (e.g., $\lambda_2$ in FIG. 2) have to pass the first section of the Bragg mirror, which acts as a transmission grating for these wavelengths. Slight reflections of $\lambda_2$ from the front section of mirror 30, therefore, interfere with stronger reflections of $\lambda 2$ from the back layers, as in a Gires-Tournouis Interferometer (GTI). The oscillations in the group delay caused by the GTI effect have an amplitude of several tens of femtoseconds, making these simple-chirped mirrors less useful for ultra short pulse generation. See Kartner et al., WO 99/60675, which is incorporated herein by reference, and Matuschek et al., "Theory of Double-Chirped Mirrors,"*IEEE J. of Selected Topics in Quantum Electronics*, 4:197–208 (1998).

To compensate for the GTI effect experienced by the longer wavelengths, engineers developed double-chirped mirrors. Referring to FIG. 3, a double-chirped mirror 50 has about 60 alternating high and low refractive index layers 52 and 54. (For clarity, FIG. 3 shows only 24 layers.) As in the simple chirped mirror, the thickness of individual layer pairs varies along the length of mirror 50, decreasing towards a front 56 of the mirror. In addition, the thickness of the high index layers 52 varies relative to the low index layers 54, such that the difference in thickness between the layers in each pair increases towards front 56. This gradual variation in the relative thickness of the high index layers 52 causes a gradual increase, or "chirping," in the coupling coefficient in the front portion, or "double-chirped" portion 58, of mirror 50. If the coupling coefficient is chirped along with the period of the grating, then the GTI effect caused by the impedance mismatch in portion 58 of the mirror can be effectively eliminated, thereby substantially reducing oscillations in the group delay found in simple chirped mirrors. Double-chirped mirrors are further described in Matuschek et al., "Analytical Design of Double-Chirped Mirrors with Custom-Tailored Dispersion Characteristics," *IEEE J. of Quantum Electronics*, 35:129–37 (1999); and Matuschek et al. (1998), supra, both of which are incorporated herein by reference.

While double chirping does substantially reduce oscillations caused by the impedance mismatch within the double-chirped portion 58 of mirror 50, it does not produce an entirely controlled group delay. The reason is that a second impedance mismatch exists in mirror 50, between the air and front 56 of the mirror. The refractive index jump between air and the first layer 60 at front 56 introduces a reflection and, consequently, a second GTI-like oscillation in the group delay. Matuschek et al. (1998), supra.

To reduce the oscillations caused by the air-mirror mismatch, engineers add a multi-layer anti-reflective (AR) coating 62 to front 56 of the mirror. Id. While the AR coating does taper the impedance, it does not entirely alleviate the mismatch. For a typical laser system, the AR coating 62 must have a very low amplitude reflectivity, r, e.g., less than 0.01, or preferably less than 0.001, to effectively reduce the oscillations caused by the air-mirror mismatch. At present, AR coatings with amplitude reflectivities less than 0.01 are expensive, and can only be achieved over a wavelength range of about 350 nm. AR coatings with amplitude reflectivities below 0.001 are not yet possible. Double-chirped mirrors with AR coatings, therefore, do not adequately reduce GTI-like oscillations caused by the air-mirror mismatch over a bandwidth greater than about 350 nm at a center wavelength of 800 nm, which is about half an octave in the frequency domain.

SUMMARY OF THE INVENTION

In general, in one aspect, the invention features a mirror system for use in generating a short duration laser pulse. The system includes first and second double-chirped mirrors disposed along an optical path within a cavity, where the second double-chirped mirror includes an additional phase-shifting layer as compared to the first double-chirped mirror. The additional phase-shifting layer causes the mirror system during use to produce a laser pulse that is characterized by oscillations in group delay substantially reduced in amplitude in comparison to oscillations in group delay for a pulse produced by the same system without the additional phase-shifting layer.

Embodiments of this aspect of the invention may include one or more of the following features. The additional phase-shifting layer can have a thickness of about ¼ of a center wavelength of the mirror. The mirrors can be computer optimized so that reflections from the mirrors have equal average group delay dispersions, but opposite oscillations in group delay dispersion over substantially all wavelengths reflected by the mirrors.

The oscillations in group delay substantially reduced in amplitude by inclusion of the additional phase-shifting layer are caused by, e.g., impedance mismatches between air and the double-chirped mirrors. The additional phase-shifting layer reduces overall oscillations by causing the oscillations in group delay resulting from the impedance mismatch between air and the second double-chirped mirror to be out of phase (e.g., by $\pi$ over all wavelengths reflected by the mirrors) with oscillations in group delay resulting from the impedance mismatch between air and the first double-chirped mirror.

In another aspect, the invention features a mirror system for use in generating a short duration laser pulse. The system includes a first mirror assembly that has one or more double-chirped mirrors, and a second mirror assembly that also has one or more double-chirped mirrors. The second assembly is arranged relative to the first assembly such that radiation reflected from the first assembly travels to the second assembly. The second assembly includes a phase-shifting element that causes the mirror system during use to produce a laser pulse having oscillations in group delay that are substantially reduced in amplitude in comparison to oscillations in group delay for a pulse produced by the same system without the phase-shifting element.

Embodiments of this aspect of the invention may include one or more of the following features. The first and second assemblies can include equal numbers of double-chirped mirrors, e.g., each can include a single mirror. The phase-shifting element can be an additional refractive layer on at least one double-chirped mirror in the second assembly. The additional layer can have a thickness of about ¼ of the center wavelength of the mirror, and can be formed from a material such as $SiO_2$, $TiO_2$, $MgF_2$, $Al_2O_3$, $AlF_9$, $HfO_2$, $NbO_2$, $ZrO_2$, $Y_2O_2$, $AlO_2$, or $Gd_2O_3$. The radiation reflected from the first assembly can travel directly to the second assembly.

In another aspect, the invention features a laser system that includes a pump, a laser crystal, and first and second double-chirped mirrors disposed on opposite sides of the crystal, such that laser light generated by the crystal reflects between the first and second double-chirped mirrors. The second double-chirped mirror has an additional phase-shifting refractive layer as compared to the first double-chirped mirror.

In another aspect, the invention features a pair of double-chirped mirrors prepared by a process that includes the steps of: (a) providing a computer model of a first double-chirped mirror that reflects over a desired wavelength range; (b) providing a computer model of a second double-chirped mirror that also reflects over the desired wavelength range, where the second double-chirped mirror has an additional layer as compared to the first double-chirped mirror, and the additional layer has a thickness equal to about ¼ of a center wavelength of the desired wavelength range; (c) optimizing the computer model of the second double-chirped mirror such that oscillations in group delay dispersion produced by the second double chirped mirror are opposite oscillations in group delay dispersion produced by the first double-chirped mirror over substantially all wavelengths in the desired wavelength range; and (d) manufacturing the first and second double-chirped mirrors in accordance with the computer models.

Embodiments of this aspect of the invention may include one or more of the following features. The preparation process can further include optimizing the first double-chirped mirror prior to optimizing the second double-chirped mirror. In addition, the process can further include: (e) adding anti-reflective coatings to the computer models of the first and second double-chirped mirrors after the optimizing step; and (f) re-optimizing the first and second double-chirped mirrors to minimize oscillations in the total group delay dispersion produced by reflection from both the first and second double-chirped mirrors over substantially all wavelengths in the desired wavelength range. The re-optimizing step can include optimizing the anti-reflective coatings of the first and second double-chirped mirrors.

The optimizing step of the preparation process can include optimizing both the first and second double-chirped mirrors simultaneously, and can include varying the thickness of layers in the model of the second double-chirped mirror.

Other embodiments and advantages of the invention will be apparent from the following description and from the claims.

DESCRIPTION OF THE PREFERRED EMBODIMENTS

Embodiments of the invention include apparatuses and methods that substantially reduce the higher order GDDs caused by the impedance mismatch between the air and the front of a double-chirped mirror. In general, the group delay oscillations are reduced by reflecting on a pair of double-chirped mirrors, rather than reflecting on a single double-chirped mirror, where the second mirror in the pair includes an additional quarter-wave refractive layer. The additional quarter-wave layer causes reflections from the second mirror to exhibit a n phase shift in the phase ripple with respect to reflections from the first mirror; if the second mirror is computer optimized, the n phase shift will extend over the full wavelength range of the mirrors. Reflecting from the two double-chirped mirrors in series, therefore, results in a coherent subtraction of first order GTI effects. This coherent subtraction allows reduction of group delay oscillations by about an order of magnitude, substantially increasing the possible bandwidth of ultra short pulses.

Quantitative Description of the Air-Mirror Impedance Mismatch

Figure 1:
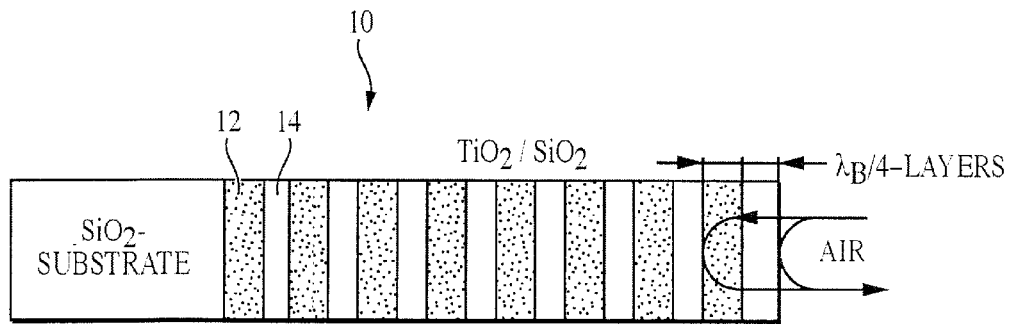
FIG. 1 is a schematic of a dielectric Bragg mirror.
Figure 2:
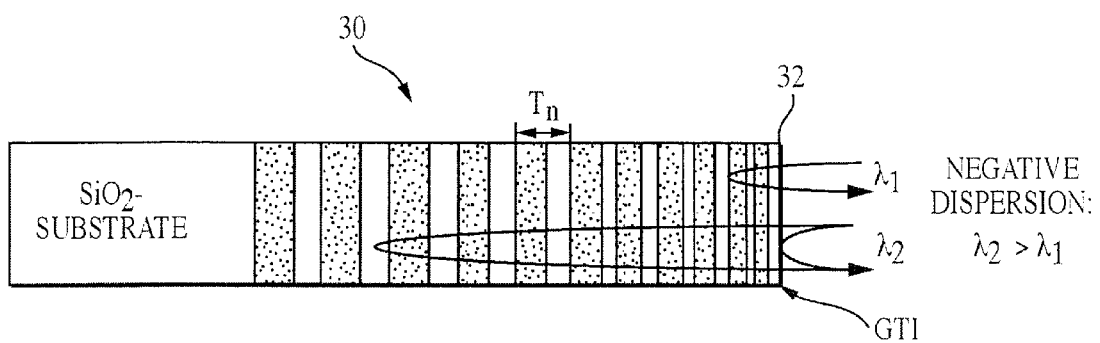
FIG. 2 is a schematic of a simple chirped mirror.
Figure 3:
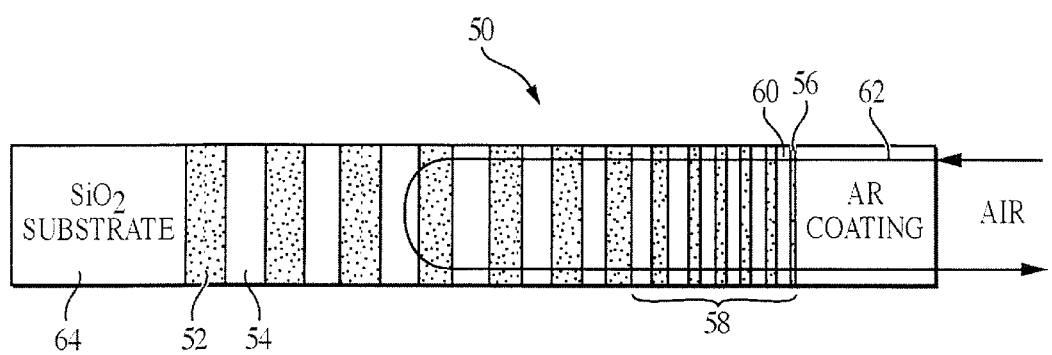
FIG. 3 is a schematic of a double-chirped mirror.
Figure 4:
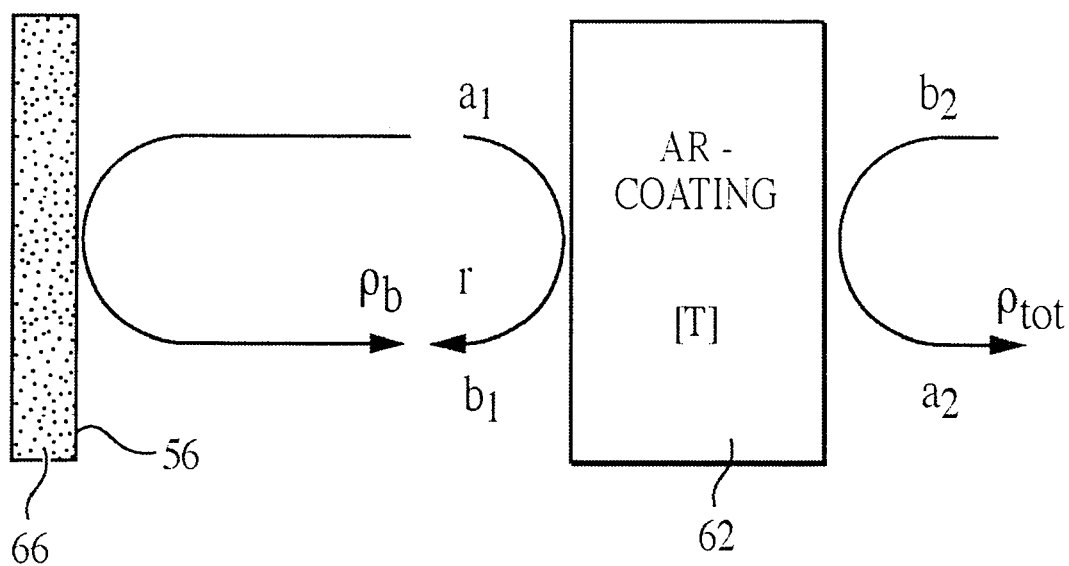
FIG. 4 is a schematic illustrating reflectivity of the double-chirped mirror of FIG. 3.

In this section, the impact of the impedance mismatch between the air and the complete double-chirped mirror 50 (i.e., including AR coating 62) is described quantitatively. Referring to FIG. 4, AR coating 62 is represented as a two-port with two incoming waves $a_1$, $b_2$ and two outgoing waves $b_1$, $a_2$. Assuming the multi-layer AR coating is loss-less (no absorption), the connection between the waves at the left port and the right port is described by a transfer matrix:

$$\begin{pmatrix} a_1 \\ b_1 \end{pmatrix} = T_{ar} \begin{pmatrix} a_2 \\ b_2 \end{pmatrix} \text{ with } T_{ar} = \begin{pmatrix} \frac{1}{t} & \frac{r^*}{t^*} \\ \frac{r}{t} & \frac{1}{t^*} \end{pmatrix} \qquad (1a)$$

Here, r and t are the reflectivity and transmission, respectively, at port 1 assuming reflection-free termination of port 2.

In FIG. 4, the black rectangle represents the "backmirror" 64, which includes all of double-chirped mirror 50 except AR coating 62. (That is, backmirror 66 includes the $SiO_2$ substrate 66 and all the alternating high and low refractive index layers 52 and 54, including double-chirped portion 58.) Backmirror 64 is assumed to be perfectly matched, and has full reflection over the total bandwidth under consideration, such that its complex reflectivity in the wavelength range of interest is given by:

$$\rho_b = \frac{a_1}{b_1} = e^{i\phi_b(\omega)}, \qquad (2)$$

where $\phi_b(107)$ is the desired phase of the total mirror 50 up to an undetermined constant phase, $\phi_o$, and a constant group delay, $T_{g0} = -d\phi_b(\omega)/d\omega|_{\omega=\omega_0}$, at the center frequency of the mirror, $\omega_0$. All higher order derivatives of the phase are determined by the desired dispersion of mirror 50.

The resulting total reflectivity of mirror 50, including AR coating 62, follows from Equations (1) and (2) to be, in general:

$$\rho_{tot} = \frac{a_2}{b_2} = \frac{t}{t^*} \rho_b \frac{1 - r^*/\rho_b}{1 - r\rho_b} \qquad 3$$

For the special case of perfect reflection of backmirror 66, the reflectivity is:

$$\rho_{tot} = \frac{t}{t^*} e^{i\phi_b(\omega)} \frac{1 - z^*}{1 - z}, \text{ with } z = re^{i\phi_b(\omega)}. \qquad 4$$

Thus, the new reflectivity is again unity, but there are contributions to the phase:

$$\phi_{tot} = 2\phi_t + \phi_b(\omega) + \phi_{GTI}, \text{ with } \phi_{GTI} = 2\arctan\left[\frac{\text{Im}\{z\}}{1+\text{Re}\{z\}}\right] \qquad 5$$

where $\phi_t$ is the phase of the transmission coefficient of AR coating 62, and $\phi_{GTI}$ is the phase due to the GTI effect created by the non perfect AR coating 62 (i.e., r~0) and backmirror 66. Im $\{z\}$ and Re $\{Z\}$ are the imaginary and real components of z, respectively.

The phase $\phi_t$ of a good AR coating (e.g., $|r|<0.1$) is essentially constant and, therefore, does not introduce undesired oscillations into the group delay or GDD. However, the phase $\phi_{GTI}$ is rapidly varying since $\phi_b(\omega)$ varies over several $2\pi$ over the frequency range of interest due to the monotonous group delay of backmirror 64. The size of these oscillations scale with the quality of the AR coating, i.e., $|r|$. The smaller the residual reflectivity of the AR coating, the smaller the oscillations in the GDD of the mirror.

Assuming the reflectivity amplitude, r, is real and less than or equal to 0.1, the oscillations in the group delay and GDD can be estimated by:

$$T_{g,GTI} = \frac{d\phi_{GTI}}{d\omega} \approx -rT_{g,b}\cos[\phi_b(\omega)], \qquad 6$$

$$GDD_{GTI} = \frac{d^2\phi_{GTI}}{d\omega^2} \approx r(T_{g',b}^2 \sin[\phi_b(\omega)] - GDD_b\cos[\phi_b(\omega)]) \qquad 7$$

with $$T_{g,b} = -d\phi_b(\omega)/d\omega, GDD_b = -d^2\phi_b(\omega)/d\omega^2$$

These GTI-reflections add up coherently when multiple reflections on chirped mirrors occur inside the laser over one round-trip, leading to "pre and post pulses," or reflections arriving before and after the true pulse reflection. Since mode-locking mechanisms in pulse generating laser systems typically only discriminate between the main pulse and satellites by at most a few percent in each round trip, the mechanisms are not strong enough to discriminate between the true pulse and the pre and post pulses. The pre and post pulses therefore exit the laser system along with the true pulse, causing oscillations in the spectrum. As discussed above, these oscillations limit the applicability of ultra-short laser pulses.

As explained above, for a typical laser system, an amplitude reflectivity r of less than 0.01, or preferably less than 0.001, is necessary to sufficiently suppress the higher order GDDs. This corresponds to an AR coating with less than $10^{-4}$ or $10^{-6}$ residual power reflectivity. Such low reflectivity coatings are not yet possible over a broad bandwidth (e.g., >350 nm).

Reduction of Group Delay Oscillations Using Double-Chirped Mirror Pairs

In embodiments of the invention, the undesired group delay and GDD oscillations described above are substantially reduced by reflections off a pair of double-chirped mirrors.

Figure 5:
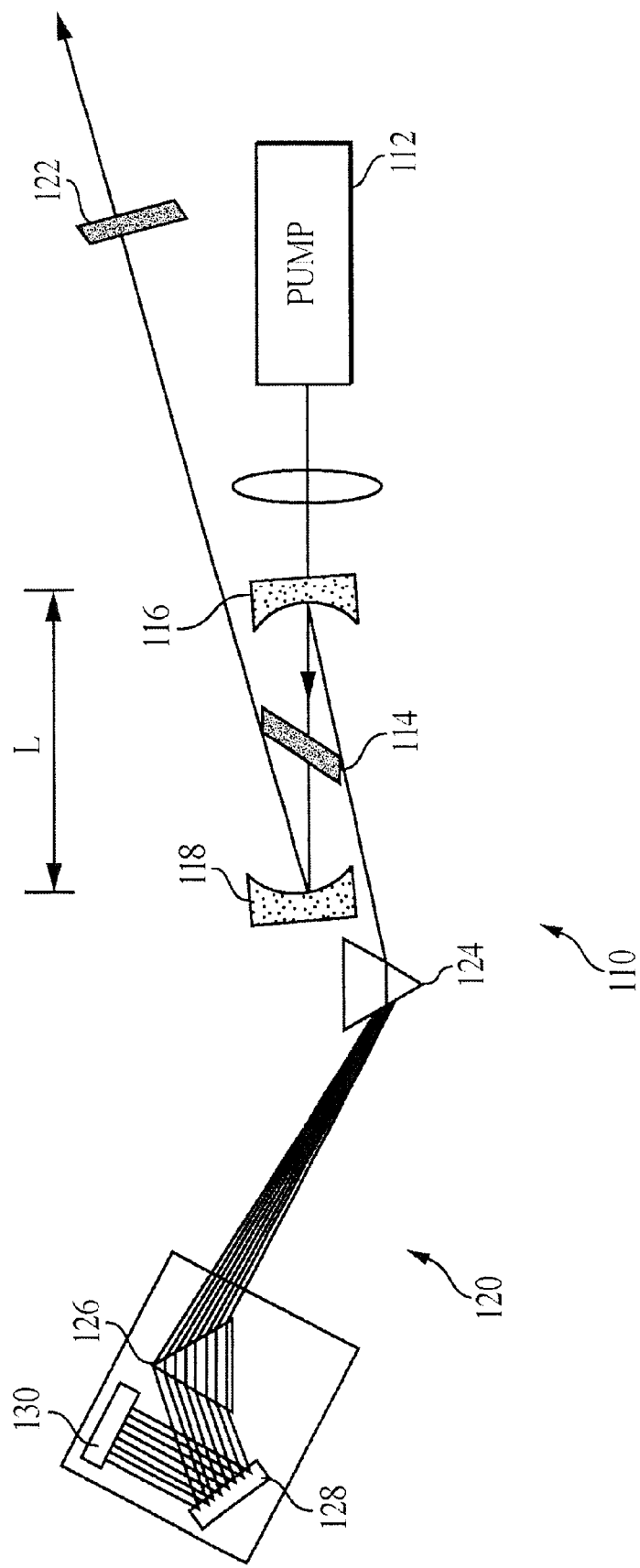
FIG. 5 is a schematic of a laser system for generating short laser pulses that includes two double-chirped mirrors.

Referring to FIG. 5, a laser system 110 includes an argon-ion pump 112, a Ti:sapphire crystal 114, a first double-chirped mirror 116, a second double-chirped mirror 118, a dispersion tuning assembly 120, and an output coupler 122. The components of the assembly are arranged to define a laser cavity between second-double chirped mirror 118 and output coupler 122, for generation of ultra-short pulses.

The crystal 114 is, e.g., 2.3 mm thick with 0.25% doping. Mirrors 116 and 118 are both concave, and are both tilted slightly with respect to the beam through the crystal. The mirrors are separated by a length L, where L is, e.g., about 10–15 cm. Assembly 120 includes two prisms 124 and 126, and two metal mirrors 128 and 130. The assembly acts to shorten the pulse width by forcing shorter wavelength light to travel a farther or shorter distance than longer wavelength light, depending on the distance between the prisms and the prism insertion into the beam. The output coupler can be, e.g., a polarizer, a filter, a standard Bragg mirror, or another device that allows some light to exit the cavity.

Figure 6:
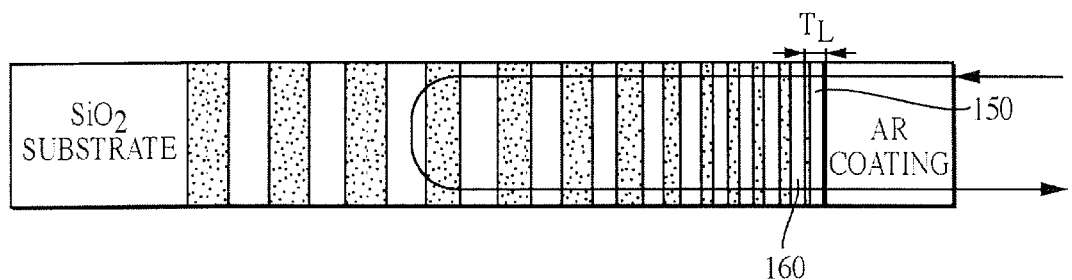
FIG. 6 is a schematic of a double-chirped-mirror that includes an additional quarter-wave refractive layer.

The alternating layer structure of first double-chirped mirror 116 is essentially identical to double-chirped mirror 50, described above, i.e., mirror 116 has about 60 alternating layers. Second double-chirped mirror 118, however, includes an additional layer. Referring to FIG. 6, second double-chirped mirror 118 includes an additional $SiO_2$ layer 150 not found on mirror 116. (For clarity, FIG. 6 shows 25 layers. In actuality, mirror 118 includes about 60 layers plus layer 150.) Layer 150 has a thickness $T_L$ approximately equal to one quarter of the center wavelength of the mirror. For example, if the center of the wavelength range reflected by the mirror is 800 nm, then $T_L$ is about 200 nm divided by the index of refraction of front layer 160.

In operation, pump 112 optically pumps crystal 114, producing laser light. The generated light passes along an optical path, from mirror 118 to mirror 116, through assembly 120, back to mirror 116, to mirror 118, and then to output coupler 122. The light which is reflected from coupler 122 (rather than leaving the cavity) then repeats the optical path in reverse. The light, therefore, reflects from mirror 116 the same number of times it reflects from mirror 118, no matter how many trips it takes through the cavity.

Compared to mirror 116, reflections from mirror 118 will show an additional phase shift of π in the group delay and GDD oscillations due to the presence of layer 150. If mirror 118 is computer optimized using, for example, the procedure described below, the π phase shift will extend over the full wavelength range of mirrors 116 and 118. If mirror 118 is optimized, therefore, the reflections from mirror 118 will follow equations (3) and (4), with z replaced by –z.

Additional layer 150 has the same index of refraction as front layer 160 to avoid an additional reflection. If the front layer 160 in mirror 118 were $TiO_2$ rather than $SiO_2$, therefore, then additional layer 150 would be $TiO_2$.

The resulting total reflectivity of mirrors 116 and 118 is given by the product of the individual complex reflectivities:

$$\rho_{tot,2} = -\left(\frac{t}{r^*}\right)^2 e^{i2\phi_b(\omega)} \frac{1 - z^{*2}}{1 - z^2}. \qquad (8)$$

As evident from equation (8), when the mirror pair 116 and 118 is used rather than a single mirror 50, the group delay oscillations caused by the air-mirror mismatches in the two mirrors counteract each other. As a result, the GTI effects for the total reflectivity scale like the power reflectivity of the AR coating, $r^2$, instead of the amplitude reflectivity, r. The net oscillations in the group delay, therefore, are substantially reduced, as compared to a system that lacks the double-chirped mirror 118 with additional layer 150.

FIGS. 7A–7E, 8A–8E, and 9A–9C demonstrate the impact of combining mirrors 116 and 118 on the oscillations in group delay and GDD. The data displayed in these figures were generated using laser systems with components similar to the components of system 110 described above. The group delay (GD) and group delay dispersion (GDD) functions were constructed by building first and second derivatives of the phase, $\phi(\omega)$, with respect to the circular frequency ($\omega = 2\pi c/\lambda$)

$$GD(\omega) = \frac{d\phi(\omega)}{d\omega} \quad GDD(\omega) = \frac{d^2\phi(\omega)}{d\omega^2}$$

Figure 7A:
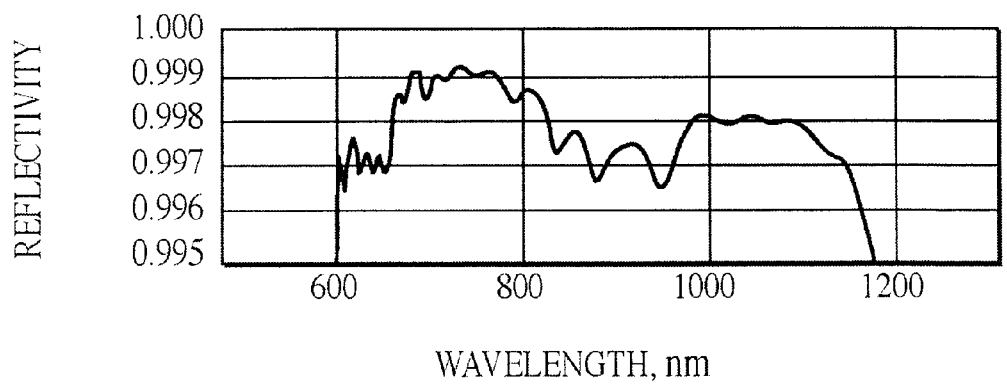
FIGS. 7A–7B are graphs representing the power reflectivity of a first doublee-chirped mirror of the laser system of FIG. 5.
Figure 7B:
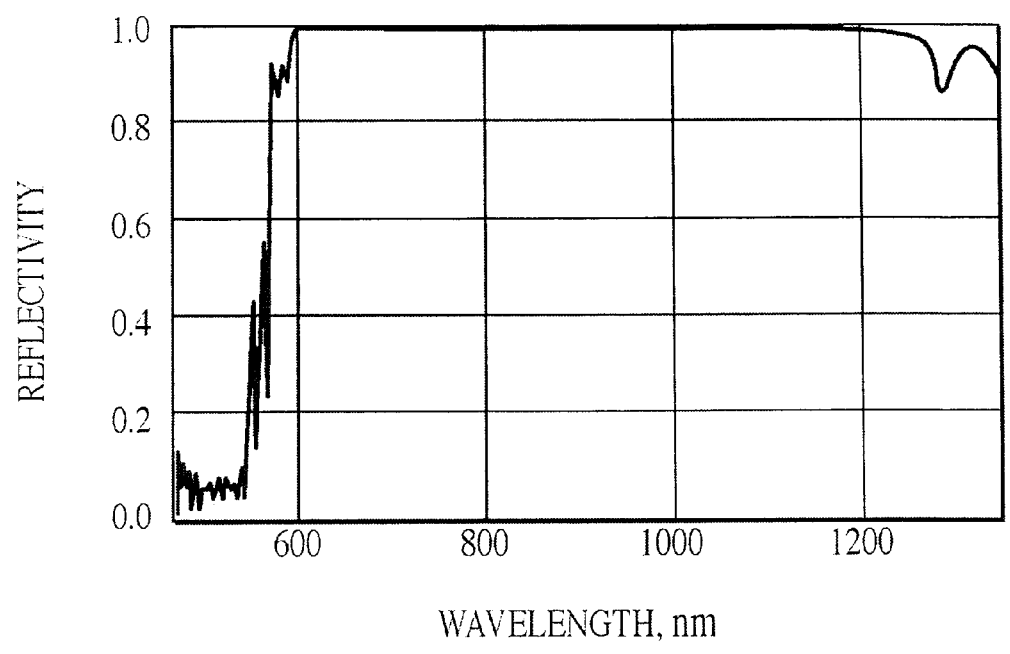
Figure 7C:
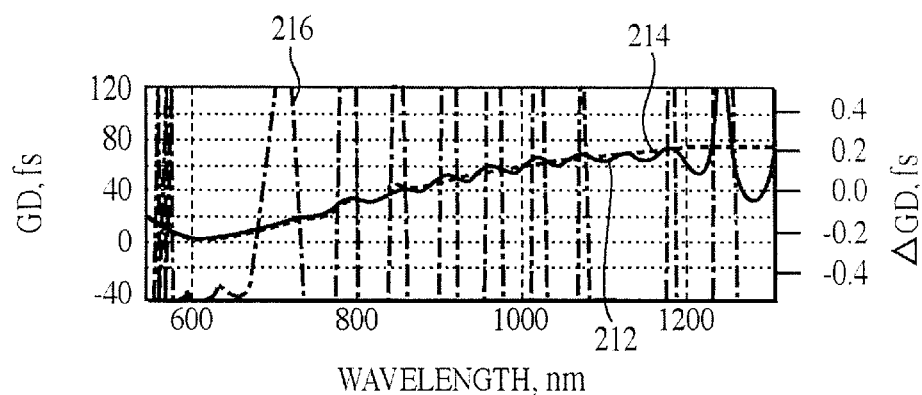
FIGS. 7C–7E are graphs illustrating the oscillations in group delay, group delay dispersion, and differential group delay dispersion, respectively, of the mirror of FIGS. 7A–7B.

FIGS. 7A–7E present data of double-chirped mirror 116. FIGS. 7A and 7B show the power reflectivity of mirror 116. FIG. 7C shows three separate group delay curves: the actual group delay produced by mirror 116 (dark curve 212), the desired, smooth group delay (dashed curve 214), and the difference between the actual and desired group delay, $\Delta GD = GD_{actual}(\omega) - GD_{desired}(\omega)$, (dot-dash curve 216). The group delay difference curve, $\Delta GD$, is measured against the right vertical axis (–0.4 to 0.4 femtoseconds), while the actual and desired GD curves are measured against the left axis (–40 to 120 femtoseconds). The $\Delta GD$ curve 216 represents the "oscillations in group delay" that limit performance of double-chirped mirrors.

Figure 7D:
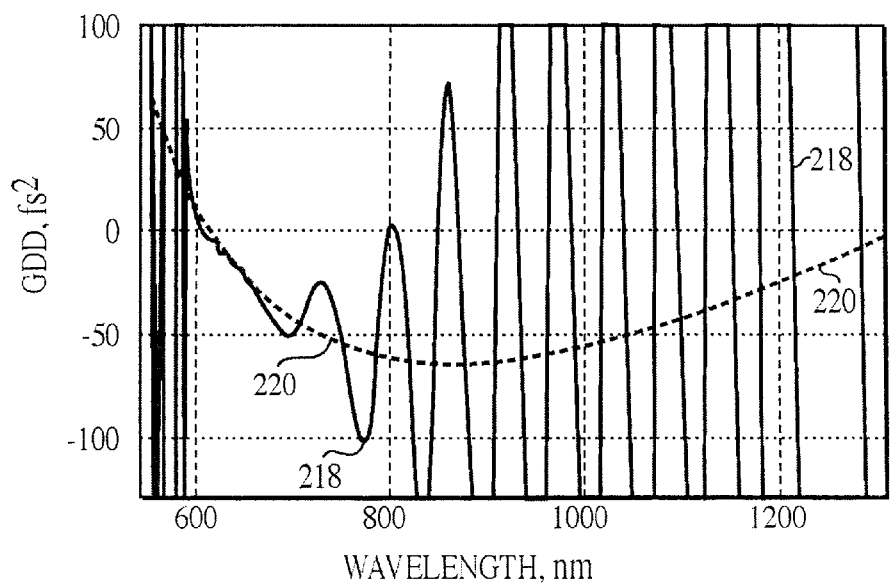
Figure 7E:
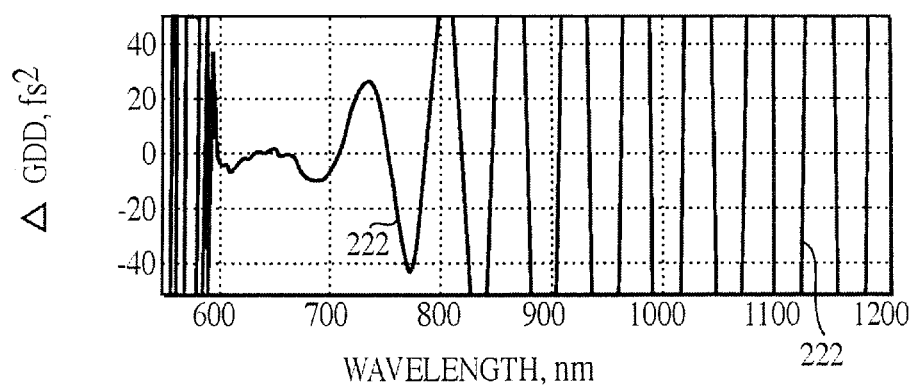

FIG. 7D shows the actual GDD (dark curve 218) and the desired GDD (dashed curve 220). FIG. 7E shows the oscillations in GDD by graphing $\Delta GDD$ (curve 222), where $\Delta GDD$ is the difference between actual GDD curve 218 and desired GDD curve 220, or $\Delta GDD = GDD_{actual}(\omega) - GDD_{desired}(\omega)$.

Figure 8A:
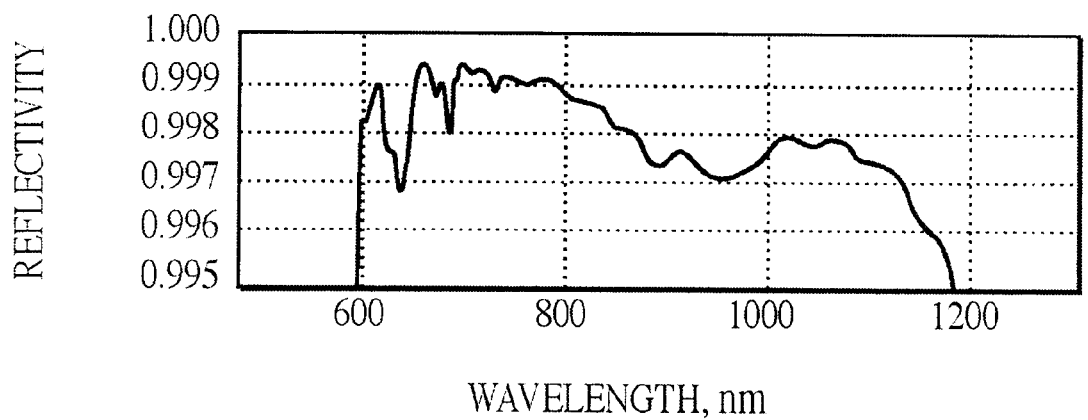
FIGS. 8A–8B are graphs representing the power reflectivity of a second double-chirped mirror of the laser system of FIG. 5.
Figure 8B:
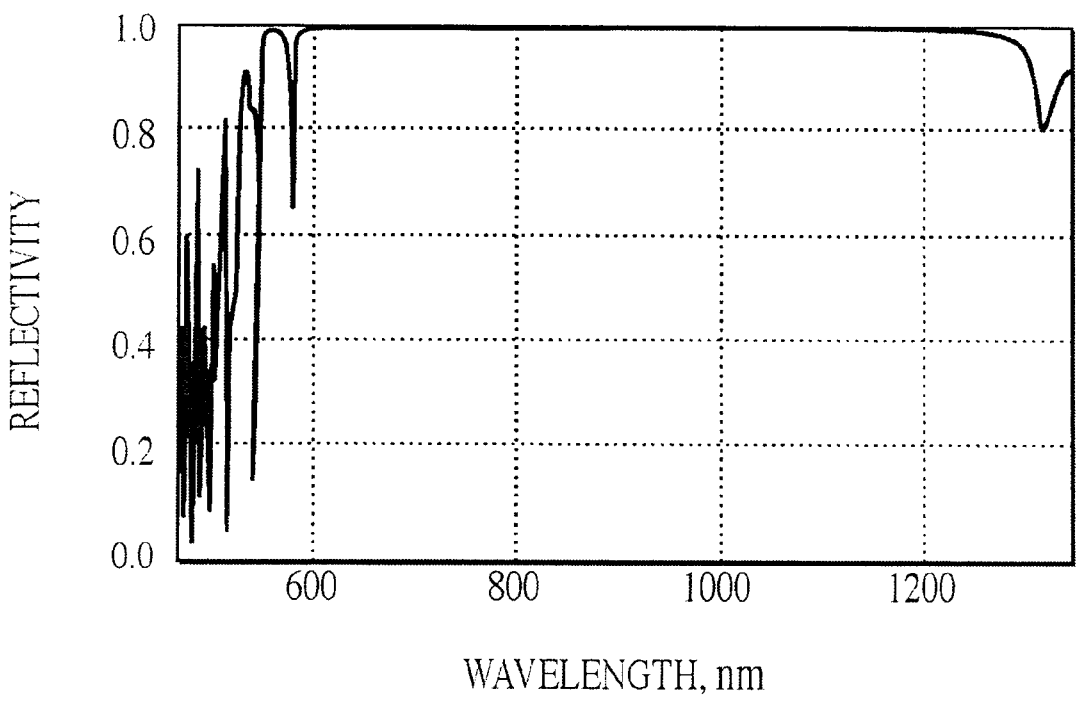
Figure 8C:
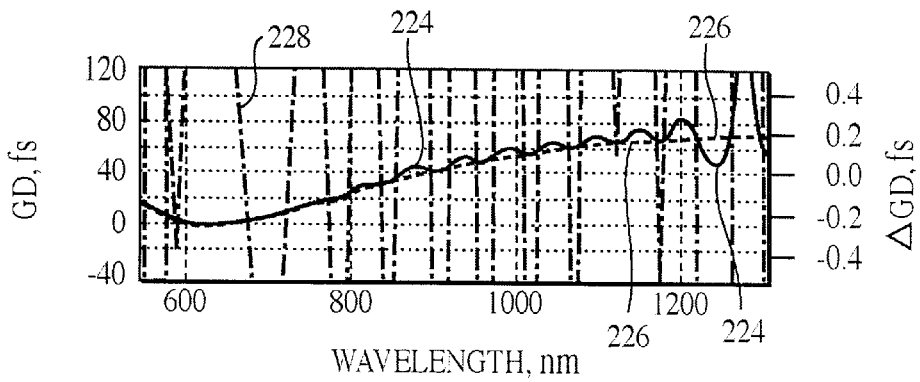
FIGS. 8C–8E are graphs illustrating the oscillations in group delay, group delay dispersion, and differential group delay dispersion, respectively, of the mirror of FIGS. 8A–8B.

FIGS. 8A–8E present similar data gathered from double-chirped mirror 118. FIGS. 8A–8B show the power reflectivity of mirror 118. FIG. 8C shows the actual group delay produced by mirror 116 (dark curve 224), the desired, smooth group delay (dashed curve 226), and the oscillations in group delay, $\Delta GD$ (dot-dash curve 228). As in FIG. 7C, $\Delta GD$ is measured against the right vertical axis, while the actual and desired GD curves are measured against the left axis.

Figure 8D:
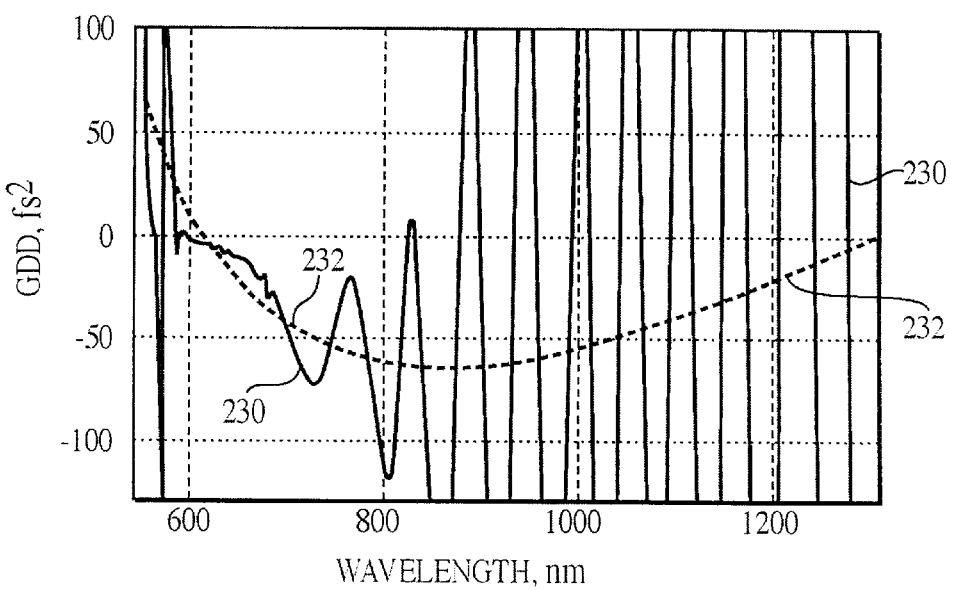
Figure 8E:
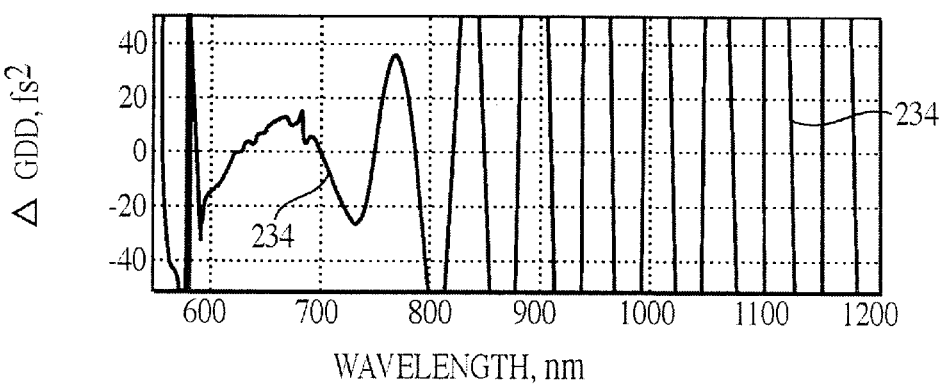

FIG. 8D shows the actual GDD (dark curve 230) and the desired GDD (dashed curve 232), while FIG. 7E shows the oscillations in GDD, or $\Delta GDD$ (curve 234). Note that the oscillations in group delay and in GDD produced by mirror 118 are opposite the oscillations produced by mirror 116.

Figure 9A:
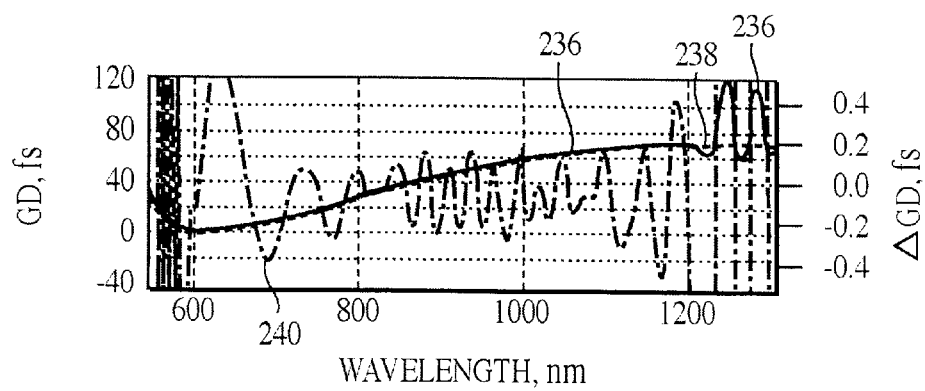
FIGS. 9A–9C are graphs illustrating the oscillations in group delay, group delay dispersion, and differential group delay dispersion, respectively, for reflections from the mirrors of FIGS. 7A–7B and 8A–8B in series.
Figure 9B:
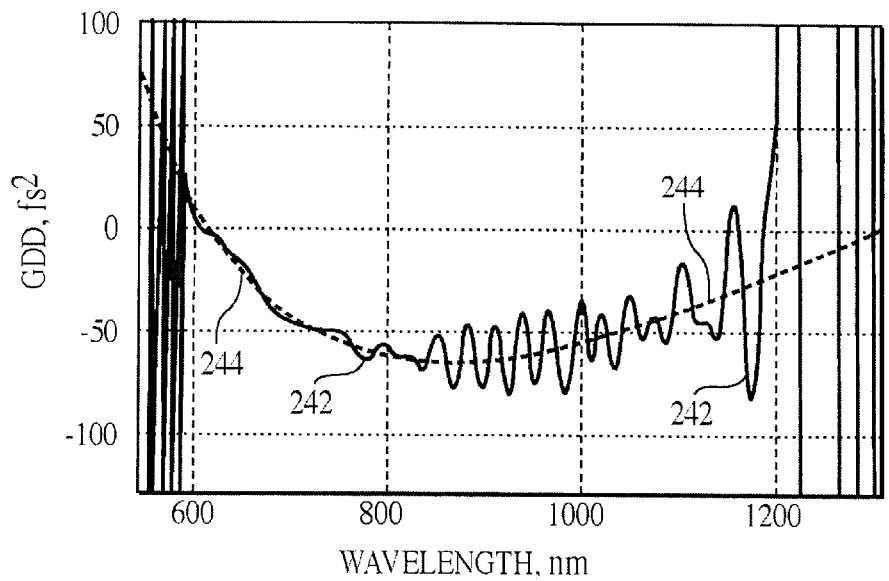
Figure 9C:
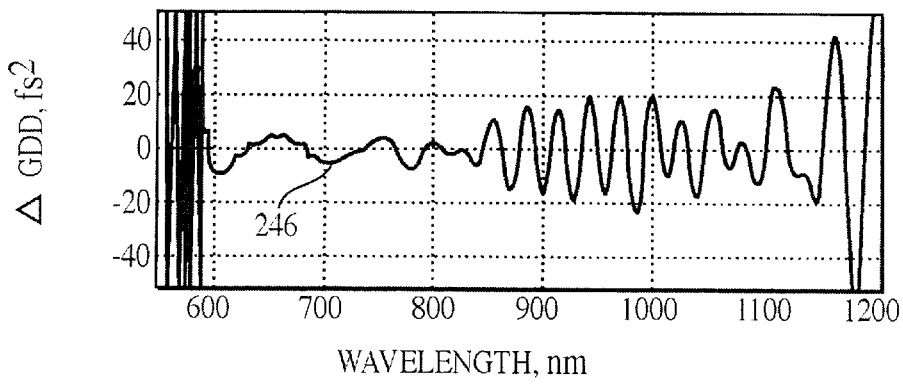

FIGS. 9A–9C present data from a mirror pair that includes both mirrors 116 and 118 arranged in series, as in system 110. FIG. 9A shows the actual group delay (dark curve 236), the desired group delay (dashed curve 238), and the oscillations in group delay, $\Delta GD$ (dash-dot curve 240). In FIG. 9A, the oscillations in group delay are reduced to the point that actual group delay curve 236 is nearly indistinguishable from the desired group delay curve 238. FIG. 9B shows the actual GDD (dark curve 242) and the desired GDD (dashed curve 244), and FIG. 9C graphs $\Delta GDD$ (curve 246). As is clear from FIGS. 9B and 9C, the oscillations in GDD are reduced by more than an order of magnitude, when compared to $\Delta GDD$ of FIGS. 7D–7E and 8D–8E.

Laser systems that use the double-chirped mirror pair 116 and 118, rather than a single double-chirped mirror, therefore, can create ultra-short pulses of greater bandwidth, or can create pulses equivalent to those produced by prior art systems more cheaply. For example, a mirror pair with AR coatings that have a residual power reflectivity of 0.01 can accomplish the same pulse as individual double-chirped mirrors with residual power reflectivities of $10^{-4}$. Since individual mirrors with power reflectivities of $10^{-4}$ are very sensitive to fabrication errors and costly to make, the mirror pair reduces the cost of pulse generation.

Using AR coatings with power reflectivities of $10^{-2}$, systems including the mirror pair can generate sub five femtosecond pulses that cover a full octave (600 nm) of bandwidth. Alternatively, the mirror pair can cover bandwidth of half an octave or less while generating extremely smooth dispersion properties. Such ultra-smooth group delays substantially improve complex broadband femtosecond laser systems that employ many mirrors.

If AR coatings with power reflectivities less than $10^{-2}$, e.g., $10^{-4}$, are used, then the group delay oscillations will be even smaller.

Optimization of Double-Chirped Mirror Pairs

Simply adding an additional refractive layer that has a thickness equal to ¼ of the center wavelength of the mirrors to one of the mirrors in the pair will reduce higher order GDDs, but only close to the center wavelength. To maximize reduction of group delay oscillations over the full bandwidth, therefore, the mirrors in the pair should be computer optimized such that the two mirrors differ by a phase shift of $\pi$ over the full wavelength range of the mirrors, rather than just at the center wavelength. Such an optimized mirror 118 will obey equations (3) and (4), with z replaced by −z, as described above.

Optimization of chirped mirrors takes into account actual variations in the index of refraction of the high and low index layers over the desired wavelength range, rather than assuming a single index value for the range. Thus, an optimization routine allows determination of the optimal thickness for each layer prior to constructing the mirror.

Optimization of double-chirped mirrors generally is described in detail in Appendix A. Briefly, an engineer (or automated software) first defines a merit function that measures the difference between current mirror characteristics and desired characteristics. The merit function includes layer thicknesses for each layer in the mirror, and defines characteristics such as reflectivity, group delay, and GDD. Each of the characteristics is weighted, reflecting to what degree each characteristic affects the total function. After defining the merit function, the function is minimized by computer through a multi-step process to determine the optimal thickness for each layer. As described in Appendix A, various types of merit functions and various optimization procedures are possible. Once the computer has determined the optimal thickness for each layer in the mirror, the mirror is constructed to meet the computer model specifications.

To optimize a pair of double-chirped mirrors, e.g., mirrors 116 and 118, so as to maximize reduction of group delay oscillations, an engineer performs the following procedure. First, mirror 116 and mirror 118 (without additional layer 150) are optimized for the desired wavelength range. Layer 150 is then added to mirror 118 in the computer model, with layer 150 having a thickness exactly equal to the ¼ of the center wavelength of mirror 118. The backmirror portion of mirror 118, including layer 150, is then re-optimized such that the group delay and GDD oscillations in the reflectivity of mirror 118 are phase shifted by $\pi$ relative to the backmirror portion of mirror 116 over the entire wavelength range of the mirrors. If desired, the mirrors can then be re-optimized in succession iteratively, until the difference between the defined and the minimized merit functions of the mirror pair is insignificant. Alternatively, after adding layer 150, both the backmirror portions of mirrors 116 and 118 can be re-optimized simultaneously until the GDD of the two mirrors together are free of undesired oscillations.

Once the optimization of the backmirrors is complete, the AR coatings are added in the computer model, and the mirrors are re-optimized to further reduce the undesired GDD oscillations. In some applications, re-optimization with the AR coatings will not be necessary.

After determining the optimal thickness for the layers, the mirrors are constructed using techniques known in the art, including the manufacturing techniques discussed in the incorporated references.

Other Embodiments

Other embodiments are within the scope of the claims. For example, the number of layers in the double-chirped mirrors can be varied. In the embodiment described, mirror 116 includes 60 layers, and mirror 118 includes 60 layers plus additional layer 150. Greater or fewer layers are possible. In addition, the alternating layers need not be $TiO_2$ and $SiO_2$, so long as the alternating layers differ in index of refraction. For example, the high index material can be $HfO_2$, $NbO_2$, $ZrO_2$, $Y_2O_2$, $AlO_2$, or $Gd_2O_3$, and the low index material can be $MgF_2$, $Al_2O_3$, or $AlF_9$.

The, additional layer can be added to the AR coating, rather than to the backmirror.

Laser system 110 can include additional elements, and can include pumps, crystals, output couplers, and tuning assemblies other than those shown and described. The double-chirped mirrors 116 and 118 can be flat, rather than concave, and the mirror pair can be positioned at different locations within system 110. Mirrors 128 and 130 in assembly 120 can be double-chirped mirrors, rather than metal mirrors.

The double-chirped mirror system within the laser system need not include only two double-chirped mirrors. For example, the system can include four double-chirped mirrors, two of which include the additional phase-shifting layer relative to the other two. In addition, the system can include an odd number of double-chirped mirrors. In such an embodiment, a first plurality of mirrors collectively produces a total reflectance having opposite group delay and GDD oscillations relative to a second plurality of mirrors; the first and second pluralities need not include the same number of mirrors.

The double-chirped mirrors can include phase-shifting elements other than an additional layer 150. For example, the element can be a series of layers that collectively produces the desired phase shift. Such a layer series could be synthesized according to the Herpin Index theorem, which states that a symmetric index step is equivalent to one layer with a certain index.

APPENDIX A: OPTIMIZATION OF A DOUBLE-CHIRPED MIRROR

Double-chirped mirrors can be optimized by constructing a merit function that includes terms for the reflectivity, group delay, and group delay dispersion over the desired reflectivity range, and optionally, terms for the reflectivity in a range that includes the pump wavelength. The merit function is then optimized first for group delay, then for group delay and reflectivity, then for group delay, reflectivity and group delay dispersion, and finally for all terms including, optionally, the pump wavelength reflectivity, by adjusting the thicknesses of layers in the mirror until acceptable values of reflectivity, group delay, group delay dispersion, and optionally pump wavelength transmission over the desired reflectivity range are achieved. In the optimization routine, the actual variations of the index of refraction over wavelength for the high and low index materials is taken into account.

In one process, the optimization proceeds as follows. A merit function $F(\{d_m\})$ is defined which is to be minimized. This is a function of all layer thicknesses $d_m$ of the low and high index layers where "m" denotes the layer number. A suitable merit function should measure the difference between the current mirror characteristics and the desired characteristics.

One possible merit function is the following:

$$F(\{d_m\}) = w_P \sum_{i=1}^{N_1} |R(\omega_i) - R_{ref}(\omega_i)|^\alpha + w_R \sum_{i=N_2}^{N} |R(\omega_i) - R_{ref}(\omega_i)|^\alpha +$$

$$w_{GD} \sum_{i=N_2}^{N} |GD(\omega_i) - GD_{ref}(\omega_i)|^\alpha +$$

$$w_{GDD} \sum_{i=N_2}^{N} |GDD(\omega_i) - GDD_{ref}(\omega_i)|^\alpha$$

This merit function splits the frequency range into three intervals:

$[\omega_1, \omega_{N_1}], [\omega_{N_1}, \omega_{N_2}]$ and $[\omega_{N_2}, \omega_N]$.

The first interval covers a frequency range for high transmission for a laser pump beam, the second interval does not enter the merit function, and the third interval covers the high reflectivity range of the mirror for which the other properties are also optimized.

Depending on the design goals and the computational power available, the number of points selected for the merit function can be varied. If the current design is close to the design goal, and sufficient computational power is available, a large number of points, e.g., 200, can be selected. If the optimization required to meet design goals is modest, then fewer points, e.g., 20, can be used. In addition, the number of points used can vary during the optimization process. For example, fewer points can be chosen at the beginning of the optimization when the initial design is far from the design goals. Then, as the design approaches the goals, more points are included.

The merit function points are preferably uniformly spaced throughout the interval $[_1, _N]$. It is possible, however, to non-uniformly space the points in part or all of the desired frequency range. For example, the points can be uniformly spaced at the ends of the desired frequency range to improve results at these end points, but not uniformly spaced elsewhere.

In the merit function above, the desired mirror properties in reflectivity (R), group delay (GD), and group delay dispersion (GDD) have the index ref. The weights, $W_R$, $W_{GD}$ and $W_{GDD}$ set how strong the different mirror characteristics will contribute to the total merit function. These weights can be adjusted interactively during the optimization process to ensure the usefulness of the final design. The exponent is most often set to one or two. If it is set large, it weights more strongly those frequency ranges where the largest deviation from the desired behavior occurs.

To minimize the merit function and thereby optimize the design, the Broyden-Fletscher-Goldfarb-Shanno Algorithm is used. This algorithm is described in detail in William H. Press et al., "Numerical Recipes in Fortran," University Press (1986), which is incorporated herein by reference. Alternatively, other algorithms can be used, including statistical optimization routines, Monte-Carlo simulations, or any of the optimization routines in Press et al., supra.

Initially, $W_R$ is set equal to 1, the other weights are set to 0, and the merit function is optimized.

Other merit functions can also be used. A suitable merit function need only have as its inputs the design goals and the current design parameters. The merit function should also output one or more values related to the difference between the goals and the current parameters so that the output of the merit function can be used as feedback for the optimization process.

Optimization of double-chirped mirrors is further described in Kartner et al., WO 99/60675.

What is claimed is:

1. A mirror system comprising:
   a first double-chirped mirror having a first back portion that includes a series of reflective layers; and
   a second double-chirped mirror in optical communication with the first double-chirped mirror, the second double-chirped mirror including
   a second back portion that is identical to the first back portion, and
   an additional phase-shifting layer in optical communication with the second back portion.

2. The system of claim 1, wherein the additional phase-shifting layer has a thickness of about ¼ of a center wavelength of the first double-chirped mirror.

3. The system of claim 2, wherein the second double-chirped mirror is configured so that, over a selected range of wavelengths, reflections from the first and second double-chirped mirrors have:
   equal average group delay dispersions, and opposite oscillations in group delay dispersion.

4. The system of claim 3, wherein the first double-chirped mirror is configured such that, over a selected range of wavelengths reflected by the first and second double-chirped mirrors, reflections from the first and second double-chirped mirrors have:
   equal average group delay dispersions, and
   opposite oscillations in group delay dispersion.

5. The system of claim 1, wherein the additional phase-shifting layer has
   an impedance selected to cause an impedance mismatch between air and the second double-chirped mirror,
   the impedance mismatch causing a group delay oscillation of combined light reflected from the first and second double-chirped mirrors to be less than the group delay oscillation would have been in the absence of the additional phase-shifting layer.

6. The system of claim 5, wherein the additional phase-shifting layer has an impedance selected such that
   group delay oscillation resulting from the impedance mismatch between air and the second double-chirped mirror is out of phase with group delay oscillation resulting from an impedance mismatch between air and the first double-chirped mirror.

7. The system of claim 6, wherein the additional phase-shifting layer has an impedance selected to cause, within a selected range of wavelengths, group delay oscillation resulting from the impedance mismatch between air and the second double-chirped mirror to be out of phase by $\pi$ radians relative to group delay oscillation resulting from the impedance mismatch between air and the first double-chirped mirror.

8. A mirror system comprising:
   a first mirror assembly including one or more double-chirped mirrors; and
   a second mirror assembly including one or more double-chirped mirrors, the second mirror assembly arranged to be in optical communication with the first mirror assembly, said second mirror assembly including
   a phase-shifting element in optical communication with at least one double-chirped mirror of the second mirror assembly.

9. The system of claim 8, wherein the first and second assemblies include equal numbers of double-chirped mirrors.

10. The system of claim 8, wherein the first and second assemblies each include a single double-chirped mirror.

11. The system of claim 8, wherein the phase-shifting element comprises an additional refractive layer on at least one double-chirped mirror in the second assembly.

12. The system of claim 11, wherein the additional refractive layer has a thickness of about ¼ of a center wavelength of the at least one double-chirped mirror in the second assembly.

13. The system of claim 12, wherein the additional refractive layer comprises a material selected from the group consisting of $SiO_2$, $TiO_2$, $MgF_2$, $Al_2O_3$, $AlF_9$, $HfO_2$, $NbO_2$, $ZrO_2$, $Y_2O_2$, $AlO_2$, and $Gd_2O_3$.

14. The system of claim 8, wherein the phase-shifting element reduces oscillations in group delay caused by impedance mismatches between air and the double-chirped mirrors in the first and second assemblies.

15. The system of claim 8, wherein the first assembly is in direct optical communication with the second assembly.

16. A laser system comprising:
   a pump;
   a laser crystal in communication with the pump; and
   a first double-chirped mirror in optical communication with a first side of the laser crystal, the first double-chirped mirror having a back portion containing a series of reflective layers; and
   a second double-chirped mirror, in optical communication with a second side of the laser crystal, the second side being opposite the first side of the laser crystal, the second double-chirped mirror having a back portion that is identical to the back portion of the first double-chirped mirror and an additional phase-shifting refractive layer that is absent from the first double-chirped mirror.

17. The system of claim 16, wherein the additional phase-shifting layer is configured to cause a combination of light reflected from the first double-chirped mirror and light reflected from the second double-chirped mirror to have a group delay oscillation having an amplitude that is less than an amplitude of a group delay oscillation of a combination of light reflected from the first double-chirped mirror and a second double-chirped mirror that is identical to the first double-chirped mirror.

18. A pair of double-chirped mirrors prepared by a process comprising the steps of:
   providing, to a computer, a first computer model of a first double-chirped mirror that reflects light over a desired wavelength range, the reflection being dependent on a first impedance associated with the first double-chirped mirror, the first double chirped mirror having a back portion that includes a plurality of reflective layers, the first computer model providing data indicative of reflection of light off the first double-chirped mirror;
   providing, to the computer, a second computer model of a second double-chirped mirror that reflects light over the desired wavelength range, the reflection being dependent on a second impedance associated with the second double-chirped mirror, the second double-chirped mirror having
      a back portion identical to the back portion of the first double-chirped mirror, and
      an additional layer having a thickness equal to about ¼ of a center wavelength of the desired wavelength range,
   the second computer model providing data indicative of reflection of light off the second double-chirped mirror;
   causing the computer to select the second impedance such that group delay oscillations produced by the second double chirped mirror are in phase opposition to group delay oscillations produced by the first double-chirped mirror over a selected range of wavelengths;
   manufacturing the first double-chirped mirror to have the first impedance; and
   manufacturing the second double-chirped mirror to have the selected second impedance.

19. The pair of double-chirped mirrors of claim 18, wherein the preparation process further comprises:
   causing the computer to select the first impedance such that, over a selected range of wavelengths, group delay oscillations produced by the first double-chirped mirror are in phase opposition to group delay oscillations produced by the second double-chirped mirror.

20. The pair of double-chirped mirrors of claim 18, wherein the preparation process further comprises:
   providing the second computer model with data representative of an anti-reflective coating on the second double-chirped mirror, the anti-reflective coating having a second coating impedance that has an effect on the second impedance; and
   causing the computer to select the second coating impedance to minimize group delay oscillations in light reflected from both the first and second double-chirped mirrors over a selected wavelength range.

21. The pair of double-chirped mirrors of claim 20, wherein the preparation process includes providing the first computer model with data representative of an anti-reflective coating on the first double-chirped mirror, the anti-reflective coating having a first coating impedance that has an effect on the first impedance.

22. The pair of double-chirped mirrors of claim 20, wherein the preparation process comprises
   causing the computer to select the first coating impedance to minimize group delay oscillations in light reflected from both the first and second double-chirped mirrors over a selected range of wavelengths.

23. A method of designing a double-chirped mirror pair, the method comprising:
   providing, to a computer, a first computer model having first data representative of a first double-chirped mirror that reflects light over a desired wavelength range;
   providing, to the computer, a second computer model representative of a second double-chirped mirror that reflects light over the desired wavelength range, the second computer model having second data representative of the second double-chirped mirror, the second data including the first data and, in addition, additional data representative of an additional layer having a thickness equal to ¼ of a center wavelength of the desired wavelength range; and
   causing the computer to alter the second data such that group delay oscillations produced by the second double chirped mirror are in phase opposition to group delay oscillations produced by the first double-chirped mirror over the desired wavelength range.

24. The method of claim 23, wherein
   providing the second computer model comprises providing second data that includes layer-thickness data representative of the thicknesses of layers of the second double-chirped mirror, and
   causing the computer to alter the second data comprises causing the computer to vary the layer-thickness data.

* * * * *